(12) United States Patent
Schultz et al.

(10) Patent No.: US 8,711,862 B2
(45) Date of Patent: Apr. 29, 2014

(54) SYSTEM, METHOD AND APPARATUS FOR PAUSING MULTI-CHANNEL BROADCASTS

(75) Inventors: Mark Alan Schultz, Carmel, IN (US); Ronald Douglas Johnson, Westfield, IN (US)

(73) Assignee: Thomson Licensing, Boulogne-Billacourt (FR)

( * ) Notice: Subject to any disclaimer, the term of this patent is extended or adjusted under 35 U.S.C. 154(b) by 38 days.

(21) Appl. No.: 12/736,174

(22) PCT Filed: Feb. 20, 2009

(86) PCT No.: PCT/US2009/001083
§ 371 (c)(1),
(2), (4) Date: Sep. 17, 2010

(87) PCT Pub. No.: WO2009/117050
PCT Pub. Date: Sep. 24, 2009

(65) Prior Publication Data
US 2011/0007745 A1 Jan. 13, 2011

Related U.S. Application Data

(60) Provisional application No. 61/070,074, filed on Mar. 20, 2008.

(51) Int. Cl.
*H04L 12/56* (2011.01)
(52) U.S. Cl.
USPC ............. 370/394; 725/394; 725/151; 725/39; 714/799
(58) Field of Classification Search
USPC ................... 370/394, 395; 725/145, 151, 39; 714/799
See application file for complete search history.

(56) References Cited

U.S. PATENT DOCUMENTS

| 4,646,280 A | 2/1987 | Toyosawa |
| 5,357,250 A | 10/1994 | Healey et al. |

(Continued)

FOREIGN PATENT DOCUMENTS

| CN | 1717024 | 1/2006 |
| CN | 1893577 | 1/2007 |

(Continued)

OTHER PUBLICATIONS

AT&T, AT&T Introduces U-Verse in Austin, Business Wire, Nov. 8, 2007.

(Continued)

*Primary Examiner* — Dang Ton
*Assistant Examiner* — Mewale Ambaye
(74) *Attorney, Agent, or Firm* — Robert D. Shedd

(57) ABSTRACT

A system and method for providing a global pause function in a broadcast multimedia system during a pause mode including an input module having an incoming timestamp counter for providing a time-based marker value to mark when each incoming packet arrives from a tuner and an outgoing timestamp counter for providing a time-based marker value for each outgoing packet to a receiver(s), the outgoing counter being configured for controlling when to release each outgoing packet to the receiver(s). At least one global memory device is provided for storing each received packet. The input module is configured to stop the outgoing counter from incrementing in response to activation of a global pause signal for the duration of the pause mode. Data flow to all of the receiver(s) is simultaneously and automatically stopped when a pause mode is enabled.

23 Claims, 6 Drawing Sheets

(56) References Cited

U.S. PATENT DOCUMENTS

| | | |
|---|---|---|
| 5,418,863 A | 5/1995 | Ando |
| 5,596,647 A | 1/1997 | Wakai et al. |
| 5,801,786 A | 9/1998 | Song |
| 5,854,591 A | 12/1998 | Atkinson |
| 5,896,129 A | 4/1999 | Murphy et al. |
| 5,956,094 A | 9/1999 | Chun |
| 5,973,722 A | 10/1999 | Wakai et al. |
| 5,995,553 A | 11/1999 | Crandall et al. |
| 6,014,381 A | 1/2000 | Troxel et al. |
| 6,052,384 A | 4/2000 | Huang et al. |
| 6,058,288 A | 5/2000 | Reed et al. |
| 6,249,913 B1 | 6/2001 | Galipeau et al. |
| 6,262,737 B1 | 7/2001 | Li et al. |
| 6,278,375 B1 | 8/2001 | Hucker |
| 6,323,767 B1 | 11/2001 | Gropper |
| 6,363,207 B1 | 3/2002 | Duruoz et al. |
| 6,377,188 B1 | 4/2002 | Maruyama |
| 6,393,343 B1 | 5/2002 | Frey et al. |
| 6,463,273 B1 | 10/2002 | Day |
| 6,539,548 B1 | 3/2003 | Hendricks et al. |
| 6,559,812 B1 | 5/2003 | McCarten et al. |
| 6,728,269 B1 | 4/2004 | Godwin et al. |
| 6,744,967 B2 | 6/2004 | Kaminski et al. |
| 6,745,021 B1 | 6/2004 | Stevens |
| 6,762,733 B2 | 7/2004 | Smith et al. |
| 6,813,777 B1 | 11/2004 | Weinberger et al. |
| 6,938,258 B1 | 8/2005 | Weinberger et al. |
| 6,978,424 B2 | 12/2005 | Safadi |
| 7,003,052 B2 | 2/2006 | Koike et al. |
| 7,028,304 B1 | 4/2006 | Weinberger et al. |
| 7,075,945 B2 | 7/2006 | Arsenault et al. |
| 7,114,171 B2 | 9/2006 | Brady, Jr. et al. |
| 7,130,724 B2 | 10/2006 | Petersen et al. |
| 7,159,230 B2 | 1/2007 | Manson et al. |
| 7,159,231 B1 | 1/2007 | Clark |
| 7,167,639 B2 | 1/2007 | Haddad et al. |
| 7,174,085 B2 | 2/2007 | Demas et al. |
| 7,177,522 B2 | 2/2007 | MacInnis |
| 7,194,611 B2 | 3/2007 | Bear et al. |
| 7,197,234 B1 | 3/2007 | Chatterton |
| 7,200,859 B1 | 4/2007 | Perlman et al. |
| 7,230,652 B2 | 6/2007 | Demas et al. |
| 7,257,308 B2 | 8/2007 | Plourde, Jr. et al. |
| 7,260,312 B2 | 8/2007 | Srinivasan et al. |
| 7,272,298 B1 | 9/2007 | Lang et al. |
| 7,272,300 B2 | 9/2007 | Srinivasan et al. |
| 7,292,604 B2 | 11/2007 | Godwin et al. |
| 7,409,140 B2 | 8/2008 | Rodriguez et al. |
| 7,565,104 B1 | 7/2009 | Brown et al. |
| 7,640,566 B1 | 12/2009 | Taylor et al. |
| 7,788,395 B2 | 8/2010 | Bowra et al. |
| 2002/0118951 A1 | 8/2002 | Suzuki et al. |
| 2002/0152470 A1 | 10/2002 | Hammond |
| 2002/0177996 A1 | 11/2002 | Cooper et al. |
| 2003/0025599 A1 | 2/2003 | Monroe |
| 2003/0037331 A1 | 2/2003 | Lee |
| 2003/0084451 A1 | 5/2003 | Pierzga et al. |
| 2003/0093798 A1 | 5/2003 | Rogerson |
| 2003/0097659 A1 | 5/2003 | Goldman |
| 2003/0114107 A1 | 6/2003 | Aoyagi |
| 2003/0208764 A1 | 11/2003 | Galipeau et al. |
| 2004/0136408 A1 | 7/2004 | Tomobe et al. |
| 2004/0155961 A1 | 8/2004 | Litwin, Jr. et al. |
| 2005/0117583 A1 | 6/2005 | Uchida et al. |
| 2005/0135787 A1 | 6/2005 | Yoo et al. |
| 2005/0138659 A1 | 6/2005 | Boccon-Gibod et al. |
| 2005/0201629 A1 | 9/2005 | Karczewicz et al. |
| 2006/0020992 A1 | 1/2006 | Pugel et al. |
| 2006/0029359 A1 | 2/2006 | Shigehara et al. |
| 2006/0136965 A1 | 6/2006 | Ellis et al. |
| 2006/0224761 A1 | 10/2006 | Howarth et al. |
| 2006/0257099 A1 | 11/2006 | Potrebic et al. |
| 2006/0275022 A1 | 12/2006 | Perlman et al. |
| 2006/0275023 A1 | 12/2006 | Perlman et al. |
| 2006/0277316 A1 | 12/2006 | Wang et al. |
| 2007/0003230 A1 | 1/2007 | Cho |
| 2007/0011343 A1 | 1/2007 | Davis et al. |
| 2007/0021099 A1 | 1/2007 | Sato |
| 2007/0065122 A1 | 3/2007 | Chatterton |
| 2007/0086488 A1 | 4/2007 | Kim et al. |
| 2007/0092078 A1 | 4/2007 | Yoshida et al. |
| 2007/0107019 A1 | 5/2007 | Romano et al. |
| 2007/0127887 A1 | 6/2007 | Yap et al. |
| 2007/0127891 A1 | 6/2007 | Demas et al. |
| 2007/0130597 A1 | 6/2007 | Parker et al. |
| 2007/0136743 A1 | 6/2007 | Hasek et al. |
| 2007/0143809 A1 | 6/2007 | Chen et al. |
| 2007/0143813 A1 | 6/2007 | Chen et al. |
| 2007/0162392 A1 | 7/2007 | McEnroe et al. |
| 2007/0166001 A1 | 7/2007 | Barton et al. |
| 2007/0180465 A1 | 8/2007 | Ou et al. |
| 2007/0192613 A1 | 8/2007 | Amoroso et al. |
| 2007/0230899 A1 | 10/2007 | Shiiyama |
| 2009/0320075 A1 | 12/2009 | Marko |
| 2011/0007745 A1 | 1/2011 | Schultz et al. |
| 2011/0307548 A1 | 12/2011 | Fisk et al. |

FOREIGN PATENT DOCUMENTS

| | | |
|---|---|---|
| CN | 1902697 | 1/2007 |
| CN | 1909696 | 2/2007 |
| EP | 0813341 | 12/1997 |
| EP | 0907281 | 4/1999 |
| EP | 1175091 | 1/2002 |
| EP | 1283639 | 2/2003 |
| EP | 1594317 | 11/2005 |
| EP | 1739676 | 1/2007 |
| EP | 1781034 | 5/2007 |
| JP | 01288190 | 11/1989 |
| JP | 578043 | 10/1993 |
| JP | 7130150 | 5/1995 |
| JP | 2001008200 | 1/2001 |
| JP | 2001054066 | 2/2001 |
| JP | 2001160940 | 6/2001 |
| JP | 2002112199 | 4/2002 |
| JP | 2002135729 | 5/2002 |
| JP | 2002269910 | 9/2002 |
| JP | 2003163892 | 6/2003 |
| JP | 200423591 | 1/2004 |
| JP | 2004248138 | 9/2004 |
| JP | 2004282644 | 10/2004 |
| JP | 2005184519 | 7/2005 |
| JP | 2005244404 | 9/2005 |
| JP | 2005310365 | 11/2005 |
| JP | 2005318049 | 11/2005 |
| JP | 2005535170 | 11/2005 |
| JP | 200623748 | 1/2006 |
| JP | 2006109301 | 4/2006 |
| JP | 2006186580 | 7/2006 |
| JP | 2006246297 | 9/2006 |
| JP | 200753738 | 3/2007 |
| JP | 2007158432 | 6/2007 |
| JP | 2008005085 | 1/2008 |
| JP | 2008193295 | 8/2008 |
| JP | 2008539638 | 11/2008 |
| WO | WO 98/43376 | * 10/1998 |
| WO | WO9843376 | 10/1998 |
| WO | WO0072592 | 11/2000 |
| WO | WO02071756 | 9/2002 |
| WO | WO 03/019932 | * 3/2003 |
| WO | WO03019932 | 3/2003 |
| WO | WO03024085 | 3/2003 |
| WO | WO03032620 | 4/2003 |
| WO | WO 03/067594 | * 8/2003 |
| WO | WO03067594 | 8/2003 |
| WO | WO03075574 | 9/2003 |
| WO | WO03092281 | 11/2003 |
| WO | WO2004034707 | 4/2004 |
| WO | WO2005045830 | 5/2005 |
| WO | WO2006114759 | 11/2006 |

(56) References Cited

FOREIGN PATENT DOCUMENTS

| WO | WO 2007/036833 | * | 4/2007 |
|----|----------------|---|--------|
| WO | WO2007036833   |   | 4/2007 |
| WO | WO2007038131   |   | 4/2007 |
| WO | WO2007056108   |   | 5/2007 |
| WO | WO2007063430   |   | 6/2007 |
| WO | WO2007076042   |   | 7/2007 |
| WO | WO2008026187   |   | 3/2008 |
| WO | WO2009117050   |   | 9/2009 |

OTHER PUBLICATIONS

Monsoon, "HAVA Video Streaming and Place-Shifting Devices", Press Release, Nov. 7, 2007.

Business Wire, "AMD Powers Up AMD Live!(TM) Home Media Server Introducing Easy, Universal Control of a Home Network", Nov. 5, 2007.

International Search Report dated Jul. 15, 2009.

* cited by examiner

SYSTEM, METHOD AND APPARATUS FOR PAUSING MULTI-CHANNEL BROADCASTS

RELATED APPLICATIONS

This application claims the benefit, under 35 U.S.C. §365 of International Application PCT/US2009/001083, filed Feb. 20, 2009, which was published in accordance with PCT Article 21(2) on Sep. 24, 2009 in English and which claims the benefit of U.S. provisional patent application No. 61/070,074, filed Mar. 20, 2008.

TECHNICAL FIELD

The present invention generally relates to broadcasting, and more particularly, to an apparatus, system and method for preventing loss of media content, such as media content delivered on a broadcast television system during an interruption period.

BACKGROUND

Satellite television is television delivered via communication satellites, as opposed to 'terrestrial television' (e.g., conventional radio wave broadcast signal television and cable television). Satellite television services often provide a wider range of channels and services than terrestrial television, including subscription-only services. Satellite television, like other communications relayed by satellite, starts with a transmitting antenna located at an uplink facility. A satellite receiver demodulates and converts the signals from the satellite to the desired form (outputs for television, audio, data, etc.) for playback to the subscriber.

Direct broadcast satellite (DBS) is a term used to refer to satellite television broadcasts which can cover both analog and digital television and radio reception, including video-on-demand and interactive features. A "DBS service" can refer to a commercial service or a group of free channels available from one orbital position targeting one country. One example of a DBS service is DirecTV™ which transmits digital satellite television and audio. In addition to residential consumers, satellite television services can be offered to businesses (such as bars, restaurants, hotels, dorms, and hospitals). A mobile service can be offered for cars, boats, and RVs, and satellite service for aircraft can be offered as well.

Pause functions are well known in devices such as VCRs. For example, if the audio/video source is a VCR tape or tapes, a pause can be implemented by simply pressing the pause button on the VCR and then pressing 'play' when an interruption period is ended to resume playback of the program(s). This form of pause typically does not require any special design techniques. However, providing a pausing real time digital streaming of hundreds of channels, such as found in an airplane satellite system, presents a challenging problem. This is compounded by the fact that typically a viewer is normally not in control of the video/audio program, other than being able to select content from what is available.

SUMMARY

In one embodiment according to the present principles, a system and method is provided for ensuring that viewers watching live broadcast television programming, such as live satellite program content such as on an aircraft, bus, train, or at a theater, etc., will not miss any of the program content on any of the channels in the event of an interruption due to, e.g., an announcement, such as an announcement made by the pilot, captain, driver, usher, flight attendant, etc. According to one aspect, a global pause feature is provided configured to momentarily store all of the delivered streams in a buffer during the interruption, and once the interruption has stopped, to automatically continue the delivery of the streamed content to the viewer from the point of interruption. Advantageously, the viewers would therefore not miss any of the program content for any of the channels.

According to one aspect, a system is provided configured to store all of the content from all sources during an interruption/pause period and to automatically resume the content's playback after the interruption stops. Such a system can be simplified, e.g., by providing all of the pause functionality in connection with centralized content distribution. This eliminates requiring each passenger's set top box to include local storage to provide a pause function. In addition, the passengers do not have to worry about handling and implementing the control functions since the saving and resuming procedures would be automatically performed for all of the programming content. In addition, the data rate for incoming signals can be handled efficiently as one entire system versus handling each channel independently, further simplifying the system's operation and increasing efficiency.

In one aspect of the present principles, a system for providing a global pause function in a broadcast multimedia system during a pause mode is provided comprising a packet processor connected to at least one tuner, the processor configured for processing and transmitting audio and video data packets received from the tuner to a plurality of receivers. The processor comprises an input module including an incoming timestamp counter for providing a time-based marker value to mark when each incoming packet arrives from the tuner and an outgoing timestamp counter for providing a time-based marker value for each outgoing packet to the receivers, the outgoing counter being configured for controlling when to release each outgoing packet. At least one global memory device is provided for storing each received packet, wherein the input module is configured to stop the outgoing counter from incrementing in response to activation of a global pause signal for the duration of the pause mode.

According to another aspect, a method for providing a global pause mode for pausing broadcast multimedia content from at least one tuner to a plurality of receivers is provided comprising the steps of processing and transmitting audio and video data packets received from the at least one tuner to a plurality of receivers, marking when each incoming packet arrives from the tuner, storing each received packet, controlling the release of each outgoing packet to the receivers by providing time-based marker values for each incoming and outgoing packet, and stopping the incrementing of the time-based marker value for each outgoing packet in response to triggering of a global pause signal for a duration of the global pause mode.

These and other aspects, features and advantages of the present principles will be described or become apparent from the following detailed description of the preferred embodiments, which is to be read in connection with the accompanying drawings.

BRIEF DESCRIPTION OF THE DRAWINGS

In the drawings, wherein like reference numerals denote similar elements throughout the views.

Figure 1:
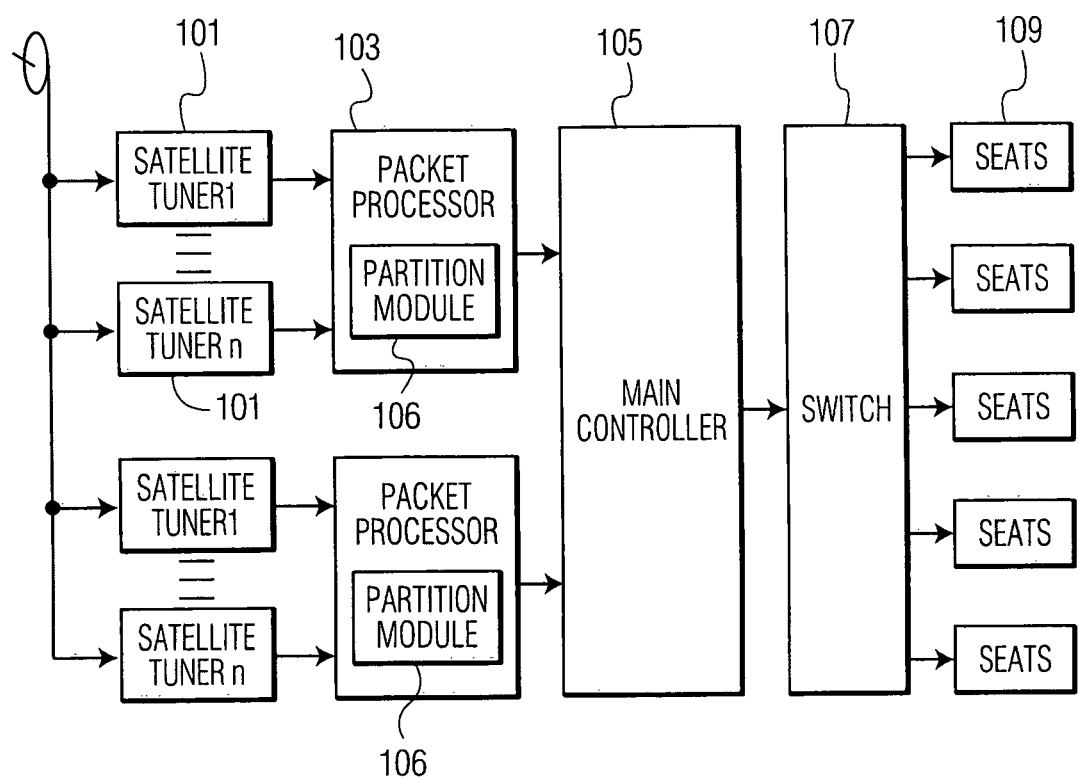
FIG. 1 is an exemplary illustration of a system that provides a global program pause function according to an aspect of the present principles.

It should be understood that the drawings are for purposes of illustrating the concepts of the present principles and are not necessarily the only possible configurations for illustrating the present principles.

DETAILED DESCRIPTION

A method, apparatus and system for providing a universal or global system pause function for broadcast programming is advantageously provided according to various aspects of the present principles. Although the present principles are described primarily within the context of an aircraft (in-flight) programming pause system and method, the specific embodiments of the present principles should not be treated as limiting the scope of the instances disclosed herein. It will be appreciated by those skilled in the art and informed by the teachings of the present principles that the concepts of the present principles can be advantageously applied in other environments in which a global pause function is desired, e.g., broadcast television/radio, satellite radio, cable, etc., in environments having contained, limited audiences such as theaters, buses, trains, etc.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the techniques described herein. Similarly, it will be appreciated that any flow charts, flow diagrams, state transition diagrams, pseudo-code, and the like represent various processes which can be substantially represented in computer readable media and so executed by a computer or processor, whether or not such computer or processor is explicitly shown.

In accordance with various embodiments of the present principles, a method, apparatus and system are described for providing a system-wide or 'global' pause function, namely, for simultaneously pausing multi-channel broadcast multimedia content broadcast to a plurality of viewers in real time. While the present principles can be applicable to any broadcast television system, the examples herein are described in relation to, e.g., aircraft satellite media environments in which media content is displayed to passengers either individually, e.g., in seat-back displays, or in groups, e.g., via a plurality of displays distributed throughout the passenger cabin. Generally, most system providers provide systems with individual controls since people generally desire independence in controlling programming content. However, passengers on trains, buses, taxis, theaters, and especially airplanes, tend to be captive audiences. Any public announcements made in such environments are typically pertinent to all the viewers/passengers and thus, a system-wide pause feature in accordance with the present principles is especially desirable and useful.

It is to be noted that each receiver (e.g., set top box) can be configured for local storage and allow individual user-enabled 'local' pause functions (e.g., to allow each user to activate a pause mode to pause content at a user-desired time). However, according to one aspect of the present principles, a 'global' or universal pause feature is further provided which does not require user activation and minimizes storage requirements for each set top box receiver. Note also that a global pause function (e.g., a pause function next to the tuners) as according to an aspect of the present principles advantageously allows users/viewers to change content and/or channels during the flight without encountering problems such as loss of data created with previous pauses. For example, a local pause function at each viewer's set top box would typically cause the loss of data whenever a channel change occurs after a pause has been implemented. The loss of data would be the time equal to the sum all of the pauses up to the point of channel change.

Advantageously, a system and method according to the present principles provides a streamlined and efficient manner in which to prevent loss of video/audio programming content playing during an 'interruption period,' e.g., periods during which the program content is paused to make, e.g., public announcements on-board to viewers/passengers, e.g., by the pilot, driver, flight attendant, etc. Further, the present system and method avoids complexity and minimizes the amount of memory needed, thus reducing costs. In one aspect, a 'universal' pause function is provided, in which a pause feature can be implemented at a main controller for automatically storing content from a plurality of channels in real-time during an interruption period. Accordingly, once an interruption period is ended, each viewer can enjoy continued viewing of media content from the point at which the interruption period commenced and will not miss any of the content during the interruption period's interim, regardless of what channel each individual viewer was watching and without having to manually activate any controls.

Referring now to the figures, FIG. 1 is an exemplary illustration of a system for providing a global program pause function in, e.g., an aircraft satellite media system according to an aspect of the present principles. A plurality of tuners 101 (e.g., tuners (1-*n*)) can be provided, each tuner being configured to receive and process media signals via, e.g., satellite. Each tuner 101 or a group of tuners (1-*n*) is connected to a network or packet processor 103 configured to process packet data transferred from each tuner 101. Multiple packet processors 103 can be provided. Packet processors 103 can include certain features and/or architectures to enhance and optimize packet processing, such as pattern matching (the ability to find specific patterns of bits and/or bytes within packets in a packet stream), data bit field manipulation (the ability to change certain data fields contained in the packet as it is being processed), and queue management (as packets are received, processed and scheduled to be sent onwards, they are stored in queues).

Figure 2:
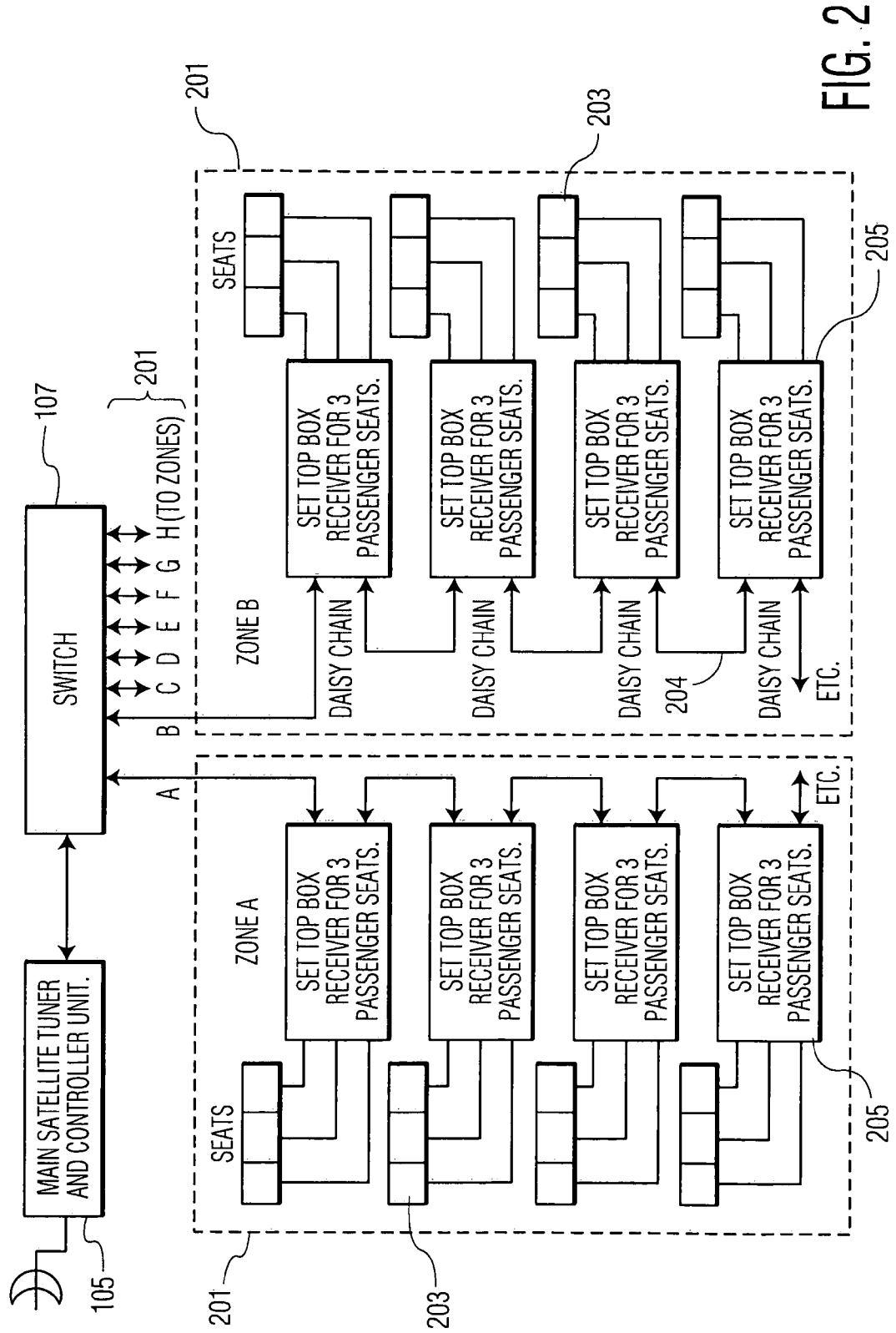
FIG. 2 is an exemplary signal distribution layout for a broadcast television system in, e.g., an aircraft according to an aspect of the present principles.
Figure 3:
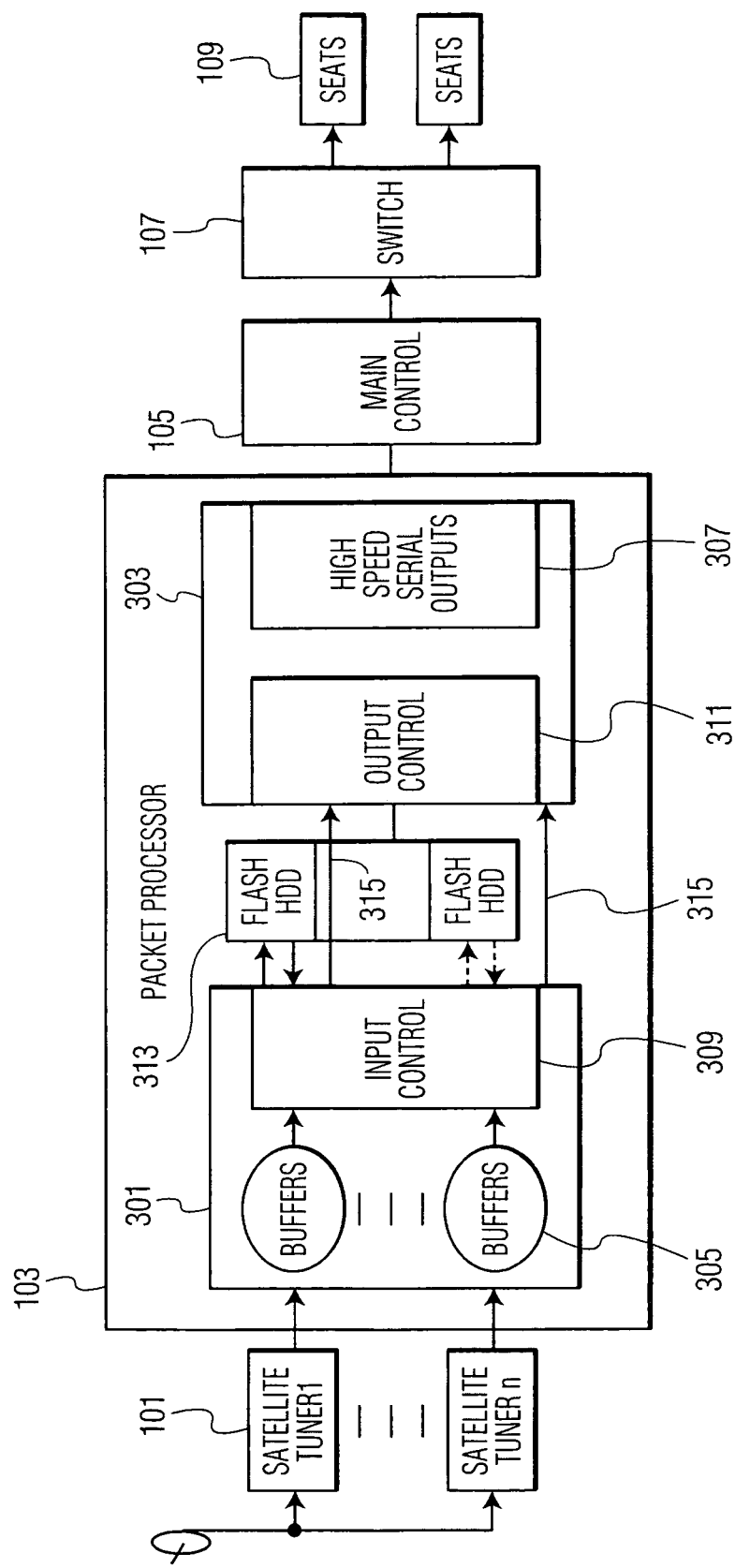
FIG. 3 is an exemplary illustration of a packet processor configured for providing a global pause function according to an aspect of the present principles.

Each packet processor 103 includes a partition module 106 functionally connected to a memory device 313 (shown in FIG. 3). Each processor 103 is connected to a main controller 105, which itself is connected to and controlled by a switch 107. The switch 107 can be configured for controlling signal output to a number and/or grouping of, for example, seats 109 (e.g., a plurality of seating 'zones' as described further with reference to FIG. 2).

FIG. 2 is an exemplary signal distribution layout for a satellite television system in an aircraft according to an aspect of the present principles. A main tuner/controller unit 105 is connected to a switch (e.g., an 8 port 1000 base T switch) 107. Switch 107 can be configured for distributing signals to a plurality of zones 201, e.g., zone A, B, C, D, E . . . etc. Each zone 201 can include a set top box (STB) receiver 205 which can be functionally connected to a plurality of seat monitors 203. For example, one STB receiver 205 can be connected to a row of three seats 203, as shown in FIG. 2, although any number of seats per receiver can be contemplated. For example, each STB 205 can be connected to each other via a 'daisy chain' wiring scheme (electrical bus) configuration 204.

Figure 4:
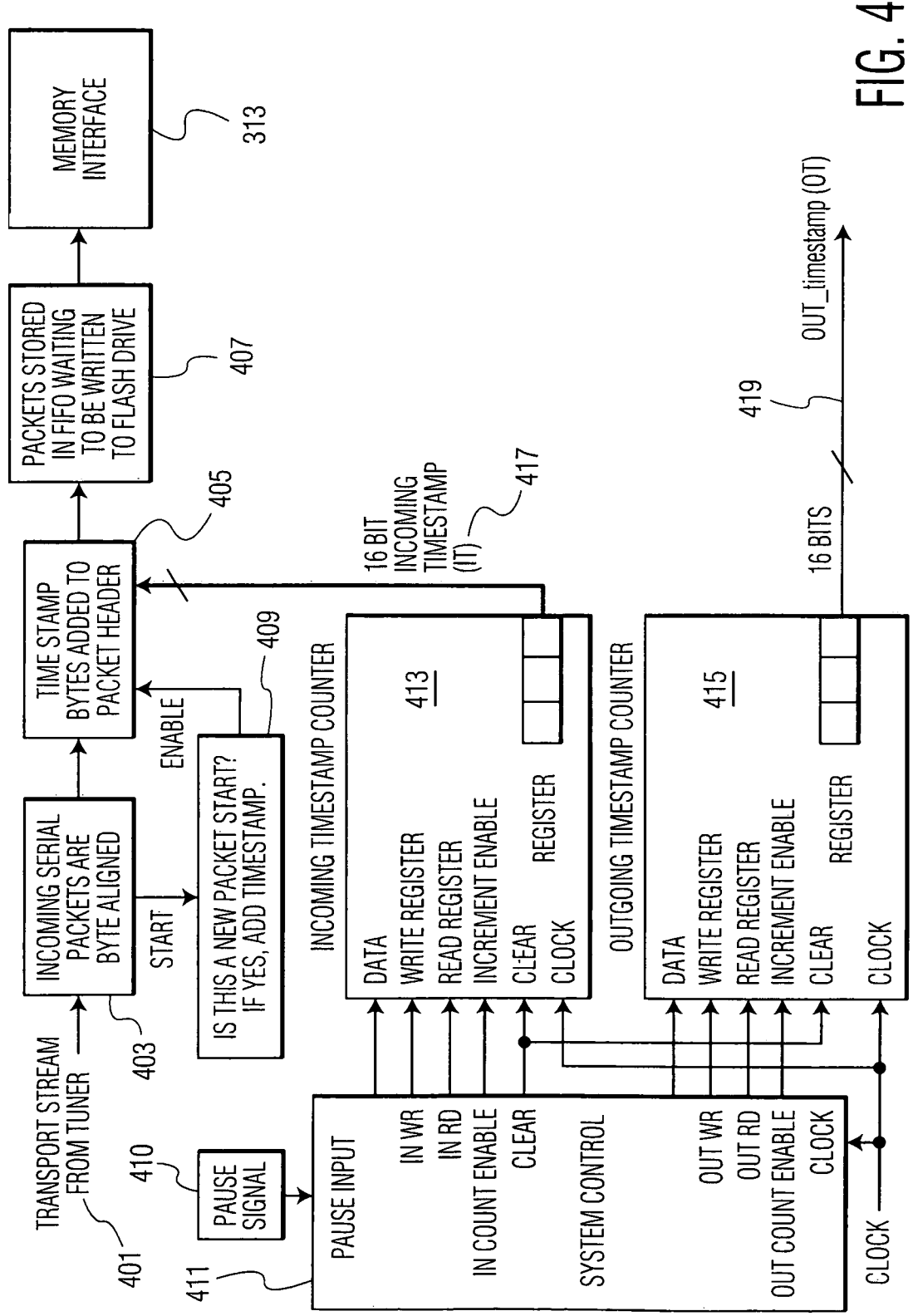
FIG. 4 is an exemplary method flow for global program pause processing at an input side according to an aspect of the present principles.
Figure 5:
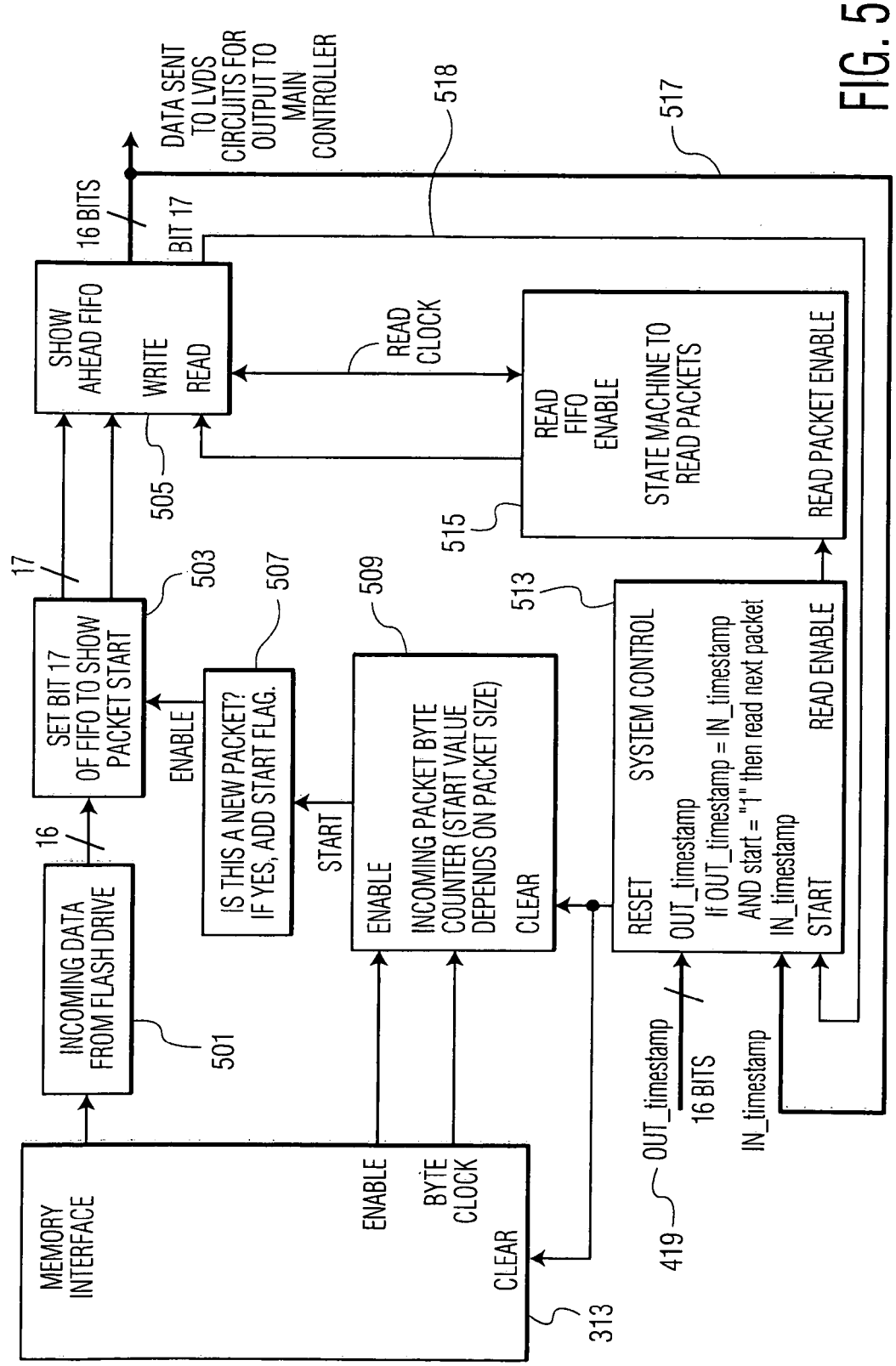
FIG. 5 is an exemplary method flow for global program pause processing at an output side according to an aspect of the present principles.

FIG. 3 is an exemplary illustration of a packet processor 103 configured for providing a global pause function, e.g., in an aircraft satellite television system according to an aspect of the present principles. FIGS. 4-5 depict exemplary method flow steps for program pause processing at an input side 301 and an output side 303, respectively, of the packet processor 103 according to an aspect of the present principles.

The processor 103 can include a capture/input module 301, a memory 313 and an output module 303 each in functional communication with one another. The capture module 301 and output module 303 can include a plurality of buffers 305 (not shown in module 303), which can preferably comprise, e.g., first-in-first-out (FIFO) buffers configured to process data such that the first data to be added to the queue is the first data to be removed, and processing proceeds sequentially in the same order. It is noted that the buffers 305 can also be included in the output control 311 of module 303. Other buffer hierarchy strategies besides FIFO can also be implemented.

The memory 313 can comprise any memory device, such as a hard disk drive (HDD), and/or preferably a non-volatile, solid-state memory device such as flash memory, which can be a more durable, efficient and suitable storage media, especially in high-altitude environments where air pressure might fluctuate, such as in airplane cabins. Since the majority of interruption periods, e.g., during a flight, can comprise announcements lasting only a minute or two, a minimum amount of memory is needed to cover a minimal system. Preferably, the memory 313 has storage capacity of, e.g., at least about 45 Mb/s for each transponder (an exemplary system setup can comprise, e.g., 32 tuners tracking 32 transponders). As broadcasted media standards change, the minimum recommended storage can change as well. Current technology is requiring more and more data to be sent for higher definition signals. However, there could be future inventions that might reduce the required amount of data. Thus, the recommended storage capacity is highly dependent on system, structure, and/or media content and the like.

Incoming data transport streams are input from tuners 101 to the buffers 305 for processing by the input module 301. The input module 301 can include an input controller 309, which itself can comprise at least a system control 411, an incoming timestamp counter 413, and an outgoing timestamp counter 415. The incoming timestamp counter 413 adds marker values/timestamps to incoming packets to register and acknowledge when packets are received and to improve data flow. For example, the incoming timestamp counter 413 is configured for marking when each incoming packet arrives from the tuner (e.g., by applying a time-based marker value to each incoming packet) and the outgoing timestamp counter 415 provides time-based marker values for each outgoing packet.

For example, as incoming serial packets are received they are byte aligned (step 403), and if it is determined that there is a new packet start, a timestamp is added (step 409), preferably to the packet header (step 405). In addition, step 409 can include flagging the packet with an extra 'start bit' to show when a packet begins. An exemplary timestamp can comprise, e.g., a 16 bit counter with a known clock reference that can be reset, programmed, or pre-loaded by the system controller. For example, a time reference about equal to ½ of the minimum single packet delivery time (~16 to 18 μs) can be used as the time stamp clock reference.

For example: Consider a 27 MHz clock reference that takes 1/27,000,000=37 ns per bit. Packets of 130 bytes*8 bits/byte=1040 bits. 37 ns*1040=38.5 μs per packet. It is desirable to mark packets at least within one packet time so, for example, select ½ of a packet time which is ~19 us so the frequency is 1/19 us=~53 KHz. As an estimate, use 2^10=1024 bits and take half of this as 512 which is 2^9. Therefore, for example:

Clock reference/(bits/packet)/2=27 MHz/130*8/2=27 MHz/520=~52 KHz

Note that the addition of timestamps can result in the addition of extra data to each packet. For example, whenever a start bit is found, two bytes of timestamp data can be added to the packet header. The time-stamped packets are then sent to the buffer 305 (step 407) and on to the memory 313 for storage. As an example, an unstamped packet can comprise 130 bytes versus a time-stamped packet at 132 bytes.

Preferably, the software (e.g., processor 103) can build and store a navigation table/register using set intervals of time to contemporaneously record the IN_timestamp and the memory address in memory 313 where this data starts. This register can be used to keep track of where data is found in memory 313 with respect to its timestamp. This enables very quick access to the desired data once a known delay or pause period is defined.

The outgoing timestamp counter 415 provides the output timestamps. Note that the OUT_timestamp counter 415 can be analogous in configuration and operation to the IN_timestamp counter 413. The outgoing timestamp counter 415 can use the same type of counter and same clock reference as the input timestamp counter 413, but the specific outgoing timestamp value is typically equal or less than the incoming timestamp counter. This is because the outgoing counter 415 provides the timestamp for the memory access that represents the time that the viewer is watching. When a global pause occurs (pause mode/period begins), the outgoing counter 415 is stopped until the pause period is ended. This pause in the counting means the outgoing count/marker value normally is lower than the incoming count value. The outgoing counter reference with a lower value than the input counter reference indicates that the value is further back in time, which tracks the location of the start of the pause feature in the time domain.

The outgoing counter 415 is configured to be able to be reset, programmed, and/or pre-loaded by the system controller 411. Both counters 413, 415 are cleared at the start of the media service and begin counting, e.g., by setting both count enables high. The IN_timestamp counter 413 is constantly counting/marking incoming packets independent of a pause mode (i.e., regardless of whether the system is in a pause mode or non-pause mode) since it provides the timestamp/marker value for incoming data. The OUT_timestamp counter 415 also counts and follows the IN_timestamp counter 413, but stops incrementing/counting whenever a global pause mode is enabled.

A system and method according to the present principles can provide a processor 103 configured to constantly watch and check for activation/triggering of a global pause signal 410. If a global pause signal 410 occurs, thus enabling a global pause mode, the input system control 411 stops the OUT_timestamp counter 415 from 'incrementing' (e.g., marking with further successive time-based marker values) for the duration of the global pause period/mode. One primary difference between the use of the counters 413, 415 is the offset in the OUT_timestamp counter 415 that is used to provide a real time output reference for the stored data. That is, when a pause period is over, the output timestamp counter 415 is referenced by an output program in the output controller 311 to find the corresponding input timestamp bytes that were captured when the packets arrived from the input counter 413. This output counter reference can comprise, e.g., the input timestamp counter minus the number of counts that represent the equivalent delay of the pause period. In one exemplary embodiment, the number of counts of the pause period can be programmed into the output counter 415 by the input system control 411.

Advantageously, by stopping the output counter 415 from incrementing during the pause period, the dataflow operation becomes automatic without requiring controller intervention. The system controller 411 can also read the output counter and then can add or subtract values from the OUT_timestamp counter 415 if repeated data and/or skipped data is desired. The output then starts counting again to provide the appropriate output timestamp reference until the next pause mode occurs. Note that if the output counter stops incrementing, the output data also stops since the incoming data timestamps are greater than the value being looked for.

For example, in the timeline shown below (Example 1) depicting an exemplary period of 20 minutes of streaming data content, a 5 minute pause period occurs starting from minute 10 to minute 15. While the data input continues to be written throughout the entire 20 minutes, at 10 minutes, the data output (reading) is stopped and the outgoing timestamp counter/marker value is noted. When the pause period is over at minute 15, the output counter searches for the output timestamp counter value (minute 10) in the input time-stamped data to resume playback starting from minute 10. Note that after the pause, the next packet of data output is the one following the last packet sent before the pause. The primary purpose of the timestamp counters is to ensure that the original transmission bit rate is maintained to avoid, for example, MPEG buffer overflows or underflows.

Example 1

|  | 0 min | ... | 10 min (pause start) | 15 min (pause end) | ... | 20 min. |
|---|---|---|---|---|---|---|
| In count: | 0 | ... | 10 ... | 15 | ... | 20 ... |
| Out count: | 0 | ... | 10 ... | 11 12 13 | ... | 15 ... 20 |

The input controller 411 is configured for both writing and reading the streaming data to or from memory 313. Details of the read and write operations and signals of the memory controller and interfaces are well known in the art and are not shown in FIG. 4 or 5. Note that in all cases, the controller 411 is configured to continuously write incoming streams to the memory 313. Even during a pause period, although the system is not reading (outputting) the data from the memory 313, incoming data is still needed to be written. When the pause period is over and playback is resumed, both reading of the playback data and writing of the incoming data are simultaneously performed.

As illustrated in FIG. 5, the output module 303 can include at least an output controller 311 which can comprise at least an output system control 513, state machine 515, a buffer 505, and an output circuit 307. The output system control 513 can include a comparator module 513 configured to check the incoming timestamps 517 of the data coming from memory 313 versus the desired timestamp to ensure that the bit buffers downstream do not overflow during media processing. As described above, for example, an additional bit in the FIFO can be used to flag the beginning of every packet to help count bytes as well as flag the timestamp in each packet.

In one exemplary embodiment, the start of each new packet sets a bit to indicate the start of a packet (step 409) along with the added timestamp. This control bit can then be sent to the FIFO buffer (step 407) to be written into the flash interface 313. Adding, e.g., an additional bit is an efficient method to mark the timestamps bytes and packet starts to reduce the amount of overhead logic. This 'start' bit that indicates a packet start and timestamp can continue with the packet through the memory 313 and be monitored by the new packet 507 and show packet start 503 blocks. In this exemplary embodiment, the start flag 518 enables the comparison of the IN_timestamp 517 of the packet 505 with the output of the OUT_timestamp counter 419 to hold the data until the timestamps match. The additional 'start' bit helps automate the flow of the data and reduces the amount of control logic.

In one embodiment, each packet processor 103 can include a delay/pause partition module 106 for each tuner 101 so that when the data is played back, the system downstream can react the same. That is, each pause partition 106 can be found in a corresponding packet processor(s) 103. The partition module 106 can be embodied in the memory 313.

If the tuners are combined in the memory, then the tuners have channels with timestamps that could be equal. E.g., 8 or 16 tuners have 8 or 16 channels with timestamps that could be equal. If the tuners are combined into a common stream to the memory (e.g., flash and/or HDD) then extra data needs to be added to identify which packet came from which tuner. This can be done in the packet processor 103. There can be one packet processor per tuner or one packet processor per system serving N number of tuners.

However, in an embodiment using partitions 106, keeping the transport streams separated in the memory (e.g., flash/HDD) (e.g., via the pause partitions) advantageously simplifies the system and can be implemented by storing one tuner's output in its own packet on the memory (e.g., flash/HDD), storing the next tuner's output in another packet, and so on. In this embodiment the difference is the packet management and not the bandwidth utilized for a defined system. The final architecture can be chosen based on bandwidth requirements versus the cost of the overhead for each additional packet processor.

A global pause control signal 410 can be provided so that the system can be notified when an interruption period is starting (e.g., an announcement is being made) and a pause function can accordingly be activated. According to one aspect, the packet processor 103 is configured to constantly check for activation of the global pause signal 410 during data delivery, and activate the global pause mode in response to triggering of the signal 410. Triggering/activation events for the global pause signal 410 can comprise, e.g., manual activation of a global pause button, or an automated activation due to an announcement being made to the viewers which necessitates the full attention of the viewers.

In one embodiment, a multiplexer can be added (e.g., see 315 in FIG. 3) to the system, to enable switching between either real time or stored (paused) content from the memory 313. For instance, guide packets can be passed in real time to the receivers to maintain appropriate real time clock references versus the paused clock references. This multiplexer can also be used for live video and audio feeds from the cockpit during the pause modes to allow the data flow.

FIG. 5 shows the output side of a global pause processing method according to one aspect of the present principles. When the interruption period/pause delay is known, the navigation table can be used to find the proper read address for the data. Note that during this entire time, the incoming data is being stored in the memory without interruptions. The desired data 501 is streamed from the memory 313, and each new packet is marked with a start flag (step 507). That is, each start of packet can be marked on an additional bit (step 503) and sent to the "Show-ahead" FIFO (505). For example, in the case of a 16 bit packet, one additional bit (bit 17) can be added. A "show ahead" type of FIFO places the data for the next read on the output bus so that only a read is required to latch the FIFO data value. In addition, this ensures that the timestamp can be found whenever the start bit (bit 17 in this example) is equal to '1'.

The system does not read the next packet of data from the FIFO until the system controller/comparator 513 compares the OUT-timestamp 419 with the IN-timestamp 517. In this example, when the start flag is equal to '1' and the OUT and IN-timestamps are equal values, the next packet will be read. This re-creates the original bit-rates found when the data was initially received, which avoids overflow of the media buffers downstream. Once the values are equal, the state machine 515 enables the read for an entire packet. The state machine 515 stops the data flow again until the IN_timestamp 517 (e.g., found in the header data stored in the flash memory) is less than or equal to the OUT_timestamp 419.

Figure 6:
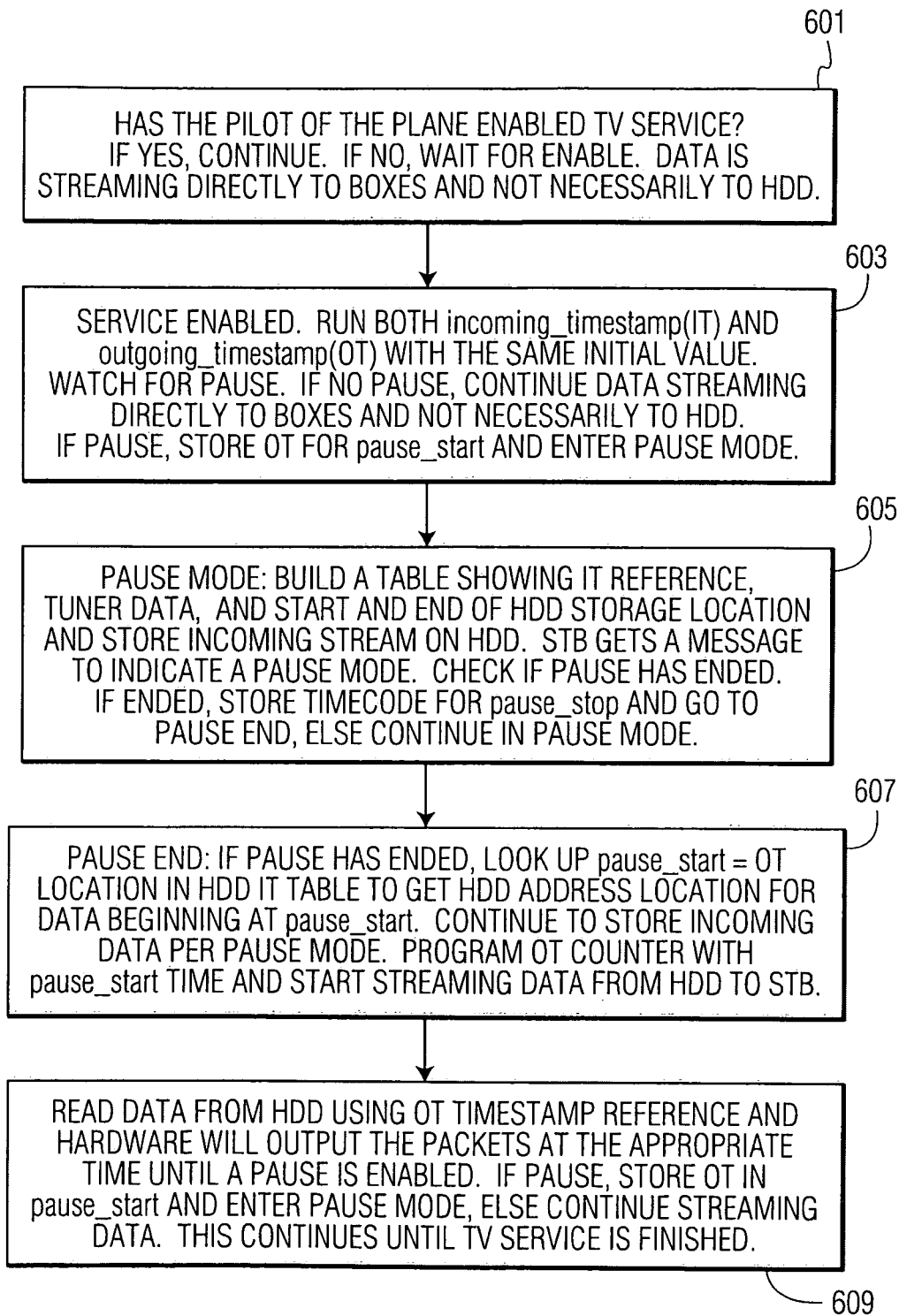
FIG. 6 is an exemplary flow diagram of a method for providing a global pause function in a broadcast multimedia system according to an aspect of the present principles.

FIG. 6 is an exemplary flow diagram of a method for providing a global system pause function in a broadcast multimedia system according to an aspect of the present principles. In step 601, the system is waiting to be enabled (e.g., for the television service to be activated or on). In step 603, the packet processor sets both incoming and outgoing timestamp counters equal and watches for a pause or interruption period to occur.

If a pause occurs, a pause mode is enabled (step 605) and the outgoing timestamps (OT) are stored. During the pause mode a reference table is preferably created showing, e.g., incoming (IT) timestamps, tuner data, and start and end flash/HDD storage locations. The incoming data stream is preferably stored in the memory 313. In one exemplary embodiment, each user set top box (STB) can receive a message to indicate a pause mode, e.g., each STB can receive another data stream with a still picture, on-screen display (OSD), or a picture freeze with overlay to indicate a pause mode. During the pause mode, the system constantly checks to see whether the pause has ended. If the pause is stopped/ended, the time codes (e.g., counter/marker value) and end address corresponding to the pause stop time are stored, and the system proceeds to step 607.

In step 607 ('pause end'), the OT counter is programmed with the pause_start location and data is streamed from the memory 313 to each set top box (receiver). That is, the navigation table is referenced to find the starting address for the IT time code/marker value equal to the pause_start location, and the data is then read from the memory 313 between the start and end addresses. For example, if the pause has ended, the processor looks up pause_start=OT location in the stored IT table to get memory address location for data beginning at the pause_start. The next HDD read is found as the next table entry, and so on.

Step 609 continues the streaming using the OT as the timestamp reference while the incoming data is marked with the IT counter. If another pause occurs, the OT register value at pause_start is stored and a pause mode is entered again (back to step 605) until the pause mode ends (step 607). The above steps continue until a pause is encountered again or the TV service is ended (step 609).

Playing back content that is regulated by the timestamps/marker values ensures that the original transport bit rates are being reconstructed on the output data from the memory 313. These original bit rates were carefully constructed at the transmitters to be sure that the media bit buffers do not overflow and/or underflow during the decoding of the transport streams. This is also why the use of solid state flash can be advantageous over HDD magnetic disc drives in the present application, since the HDDs can have large variations in access times for reading and writing data while flash drives do not.

Although the embodiment which incorporates the teachings of the present principles has been shown and described in detail herein, those skilled in the art can readily devise many other varied embodiments that still incorporate these teachings. Having described preferred embodiments for a system and method for providing a global system pause function for broadcast multimedia programming (which are intended to be illustrative and not limiting), it is noted that modifications and variations can be made by persons skilled in the art in light of the above teachings. It is therefore to be understood that changes can be made in the particular embodiments of the principles disclosed which are within the scope and spirit of the inventive principles as outlined by the appended claims. Having thus described the invention with the details and particularity required by the patent laws, what is claimed and desired protected by Letters Patent is set forth in the appended claims.

The invention claimed is:

1. A system, comprising: a processor that receives content and tracks the content reception and playback while buffering the content to allow pausing of the content playback without interrupting reception of the content, and wherein the processor is a packet processor connected to at least one tuner, the processor configured for processing and transmitting audio and video data packets received from the tuner to a plurality of receivers, the processor comprising: an input component including an incoming timestamp counter for providing a time-based marker value to mark when each incoming packet arrives from the tuner and an outgoing timestamp counter for providing a time-based marker value for each outgoing packet to the receivers, the outgoing counter configured for controlling when to release each outgoing packet; and at least one memory device for storing each received packet, wherein the input component is configured to stop the outgoing counter from incrementing in response to an activation of a pause signal for a duration of the pause mode and provides a count number representative of the pause duration.

2. The system of claim 1, wherein the memory device comprises at least one of a flash or hard disk (HDD) memory configured for storing data from said at least one tuner for playback to said plurality of receivers.

3. The system of claim 1, wherein each new packet read from the memory includes a start bit.

4. The system of claim 1, wherein the packet processor employs a navigation table for recording at least the incoming packet marker value and its corresponding memory address in the memory.

5. The system of claim 1, wherein during the pause mode simultaneously stops at least one of the audio and video data flow to the receivers.

6. The system of claim 1, wherein during the pause mode, the input module is configured to continue writing the incoming packets to the memory.

7. The system of claim 1, wherein during a non-pause mode, the input control is configured to simultaneously write the incoming packets to the memory and read outgoing packets from the memory.

8. The system of claim 1, wherein the input and output modules include First-In-First-Out (FIFO) buffers.

9. The system of claim 1, wherein the processor further includes a multiplexer to enable switching between playback of real-time content and stored content from the memory.

10. The system of claim 1, wherein each processor further includes a partition module configured for enabling individual storage of each tuner's output in a corresponding separate packet in the memory.

11. The system of claim 1, wherein the activation of the pause signal is caused by at least one of manual activation of a pause button or an announcement being made to viewers of the multimedia content.

12. The system of claim 1, wherein the processor further comprises:
an output module, responsive to a pause in the multimedia content playback, that plays back the buffered multimedia content starting approximately at the time that the pause was received when playback is resumed.

13. The system of claim 12, wherein the output module includes a comparator module configured to compare marker values of packet data stored in a memory device with marker values of outgoing packets.

14. The system of claim 13, wherein the comparator module is configured to stop the data flow to receivers until the marker value of the packet data stored in the memory device is less than or equal to the marker value of the outgoing packet.

15. The system of claim 1 utilized as a pause function in a broadcast multimedia system.

16. A method, comprising the steps of:
tracking content reception and playback while buffering the content to allow pausing of the content playback without interrupting reception of the content, wherein the tracking of content reception and playback comprising processing and transmitting audio and video data packets received from at least one tuner to a plurality of receivers;
marking when each incoming packet arrives from the tuner;
storing each received packet;
controlling the release of each outgoing packet to the receivers by providing time-based marker values for each incoming and outgoing packet;
stopping the incrementing of the time-based marker value for each outgoing packet in response to a triggering of a pause signal for a duration of the pause mode; and
providing a count number representative of the pause duration to enable playback after the pause mode ends; and
playing back the buffered content starting approximately at the time that a pause was received when playback is resumed.

17. The method of claim 16, the step of storing further comprising:
writing each received packet to a memory device configured for storing data from said at least one tuner for playback to said plurality of receivers.

18. The method of claim 17, further comprising:
recording at least each incoming packet marker value and its corresponding memory address in the memory.

19. The method of claim 18, further comprising the step of ending the pause mode, wherein the step of ending comprising:
storing the marker value and an end address corresponding to a pause stop time;
determining a pause start location by finding a start address in the memory corresponding to the marker value of the pause start location;
reading the data between the start address and the end address; and
comparing the marker value from the memory with the marker value of each outgoing packet.

20. The method of claim 19, the step of comparing comprising:
stopping the data flow to the receivers until the marker value from the memory is less than or equal to the marker value of the outgoing packet.

21. The method of claim 16, further comprising:
triggering of the pause signal by at least one of manual activation of a pause button or an announcement being made to viewers of the multimedia content.

22. The method of claim 16, further comprising:
simultaneously stopping the audio and video data flow to receivers during the pause mode.

23. The method of claim 16 employed as a pause mode for pausing broadcast multimedia content from at least one tuner to a plurality of receivers.

* * * * *